United States Patent
Martin et al.

(10) Patent No.: US 6,338,066 B1
(45) Date of Patent: Jan. 8, 2002

(54) SURFAID PREDICTOR: WEB-BASED SYSTEM FOR PREDICTING SURFER BEHAVIOR

(75) Inventors: David Charles Martin; Hansel Joseph Miranda, both of San Jose; Mark Paul Plutowski, Santa Cruz; William Scott Spangler, San Martin; Shivakumar Vaithyanathan, San Jose; Kevin Wheeler, Mountain View; David Hilton Wolpert, Los Gatos, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/160,828

(22) Filed: Sep. 25, 1998

(Under 37 CFR 1.47)

(51) Int. Cl.[7] .............................................. G06F 15/163
(52) U.S. Cl. .................................. 707/10; 707/5; 707/6; 707/102; 709/203; 709/217; 709/223
(58) Field of Search .......................... 707/5, 6, 10, 102, 707/201; 709/203, 217, 223

(56) References Cited

U.S. PATENT DOCUMENTS

| | | | |
|---|---|---|---|
| 5,664,115 A | | 9/1997 | Fraser .......................... 705/37 |
| 5,678,041 A | | 10/1997 | Baker et al. .................... 707/9 |
| 5,712,979 A | * | 1/1998 | Graber et al. ................ 709/224 |
| 5,802,292 A | * | 9/1998 | Mogul ........................ 709/203 |
| 5,892,917 A | * | 4/1999 | Myerson ...................... 709/224 |
| 5,917,891 A | * | 6/1999 | Will ........................ 379/88.03 |
| 5,974,572 A | * | 10/1999 | Weinberg et al. .............. 714/47 |
| 5,977,964 A | * | 11/1999 | Williams et al. ............. 345/327 |
| 6,020,884 A | * | 2/2000 | MacNaughton et al. ..... 345/329 |
| 6,052,730 A | * | 4/2000 | Felciano et al. ............. 709/225 |
| 6,055,569 A | * | 4/2000 | O'Brien et al. .............. 709/223 |
| 6,055,573 A | * | 4/2000 | Gardenswartz et al. ...... 709/224 |
| 6,085,226 A | * | 7/2000 | Horvitz ....................... 709/203 |
| 6,167,441 A | * | 12/2000 | Himmel ....................... 709/217 |
| 6,182,133 B1 | * | 1/2001 | Horvitz ....................... 709/223 |

OTHER PUBLICATIONS

Brachmann, R. et al., "The Process of Knowledge Discovery in Databases", Section 2, pp. 37–57 (Date Unknown).

Duda, R. et al., "Pattern Classification and Scene Analysis", *Stanford Research Institute*, Menlo Park, California, a Wiley–Interscience Publication, John Wiley & Sons, 8 pages (Date Unknown).

Monthly Newsletter "Intelligent Software From Cutter Information Corp. Strategies", XII(12):1–16 (Dec. 1996).

Press W. et al., "Numerical Recipes in C", *The Art of Scientific Computing Second Edition*, Cambridge University Press, 2 pages (Date Unknown).

Strang, G., "Linear Algebra And Its Applications", Second Edition, Academic Press, Cover Sheet and pp. 136–145 (Date Unknown).

* cited by examiner

Primary Examiner—Jean R. Homere
(74) Attorney, Agent, or Firm—Altera Law Group, LLC

(57) ABSTRACT

Given a log of previous web-surfer behavior listing the order in which each surfer downloaded specific items at the web site, and given a meaningful classification of those same items, future surfer behavior is predicted by the present invention. The algorithm utilizes a quantitative model relating items downloaded prior to some specified event to items downloaded after that same event. When the model is applied to a new surfer's session prior to an analogous event, the present invention predicts the likely behavior of the surfer subsequent to that event. The predicted behavior is then further analyzed to derive a quantitative value for the utility of the expected behavior.

By randomly selecting sample sessions from a web log, multiple models of surfer behavior can be generated. The multiple models can then be applied to a new surfer's session to produce a predicted behavior/utility distribution and thus a confidence interval for the predicted behavior/utility.

7 Claims, 5 Drawing Sheets

SURFAID PREDICTOR: WEB-BASED SYSTEM FOR PREDICTING SURFER BEHAVIOR

BACKGROUND OF THE INVENTION

1. Field of the Invention

This invention relates in general to computer behavior prediction, and in particular predicting a given web surfer's behavior based on the behavior of past surfers.

2. Description of Related Art

As the popularity and usefulness of the Internet grows, and more of the general public are able to access the Internet both at home and at work, marketing of Internet services and other items has become more popular. However, mass marketing of certain items to everyone becomes wasteful and expensive, because each Internet user (surfer) visits different Uniform Resource Locator (URL) sites. Further, each Internet user (surfer) has various susceptibilities to different products, marketing techniques, and presentation styles.

Each URL has an associated web server log, which records each surfer's visit, which pages were downloaded, and whether a purchase was made from that URL. However, the web server log has not been utilized by advertisers to determine or predict behavior of a given surfer based on prior users.

Currently, advertisers are mass marketing their advertisements to all users. This approach, although simple, is less effective than other advertising techniques, e.g., time slotting of certain advertisements, demographic studies, etc. However, most Internet users are anonymous, making demographic targeting difficult. Further, no modeling of Internet user behavior, nor any studies of Internet advertisement success, have been performed to predict behavior.

One potential way to distinguish surfers is through a unique identifier that a site may provide to a customer's web browser software for use in identification during future visits to the site, also called a "cookie." Unfortunately this method has the potential to violate consumer privacy. Further, current web browsers, such as Netscape, make it easy for even novice users to disable this identification feature, making identification difficult. Further, this tool is unlikely to be an effective user identification in the future.

A second way to distinguish surfers is to question them directly as a requirement for entering the site. The answers to such questions may or may not be associated with a given user id and password for use in the future. This method has two problems. First, users may be unwilling to supply such information and therefore may forego visiting the site. Second, even when the information is supplied, its veracity is subject to question.

A third way to distinguish surfers is to analyze their surfing behavior while visiting the site and deduce from this behavior how they might best be influenced to increase their buying behavior. This method of distinguishing surfers has been tried in the past by other companies including Aptex® and FireFly® using neural nets and Nearest Neighbor techniques. However, these methods have not shown much success.

It can be seen, then, that there is a need for a way to predict a given web surfer's behavior based on past surfer behavior. It can also be seen that there is a need for advertisers to target advertisements to certain surfers or groups of surfers on the Internet.

SUMMARY OF THE INVENTION

To overcome the limitations in the prior art described above, and to overcome other limitations that will become apparent upon reading and understanding the present specification, the present invention discloses a method for predicting a given web surfer's behavior based on the behavior of past surfers.

A method in accordance with the teachings of the invention comprises storing a log of visits to a website and categorizing a plurality of pages of the website into a group. The log and group are processed into at least three classifications, e.g., features, actions, and behaviors, and the features and behaviors are sorted by the actions associated with the features and behaviors. The features and behaviors are then grouped by the associated action, models are generated for each action; and a predictive model for each action and behavior is generated.

An object of the present invention is to predict a given web surfer's behavior based on past surfer behavior. Another object of the present invention is to target advertisements to certain demographic groups on the Internet.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Introduction

One of the key problems facing merchants on the World Wide Web (Web) is how to most effectively utilize the information provided by their web server logs to increase sales, and thereby increase profits. The Web provides the potential for one-to-one marketing of products to customers. However, successful marketing can only be accomplished if the unique characteristics of each Web customer (surfer) can be distinguished, and proper advertisements, i.e., those that have a high probability of success, are placed in front of the proper surfers. If the proper advertisement is not placed in front of the most likely purchasing surfer, the likelihood of a purchase is dramatically reduced.

The present invention presents a new method for predicting future surfer behavior based on what the surfer has done in the past and comparing this behavior to similar prior surfer behavior. This method may be used separate from, or in conjunction with, information gathered via other sources, e.g., cookies, demographic information, or through answers to direct questions.

This method has been implemented in the present invention, hereinafter referred to as the SurfAid Predictor. One application for the SurfAid Predictor of the present invention would be to select one advertisement from a set of potential advertisements based on the advertisement's total predicted effect on buying behavior. Another application for the SurfAid Predictor of the present invention is to select one link from a set of potential links based on the predicted behavior of the surfer and the potential that the surfer will want to use the link presented.

Hardware Environment

Figure 1:
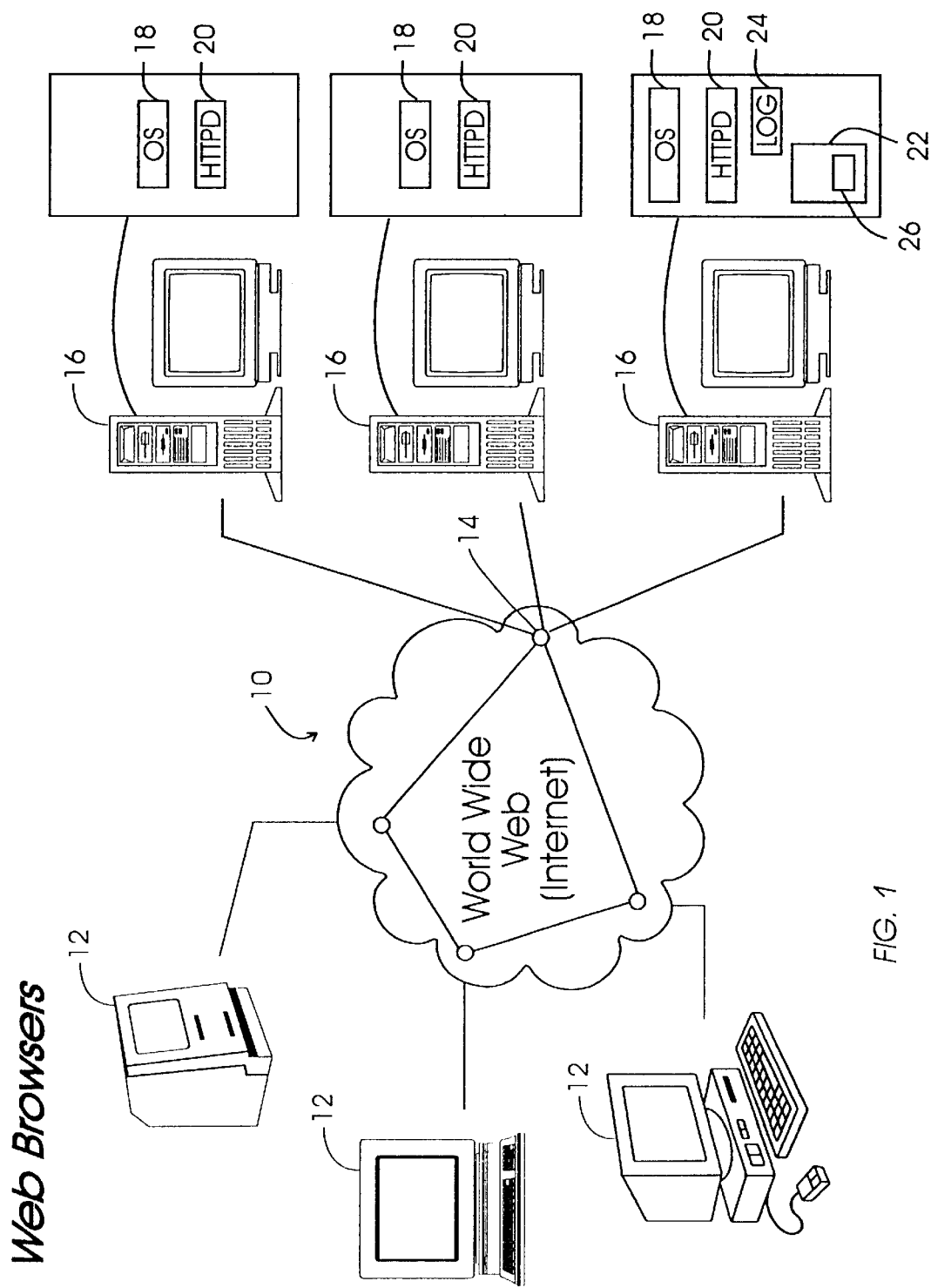
FIG. 1 is a block diagram of an exemplary hardware environment of the preferred embodiment of the present invention, and more particularly, illustrates a typical distributed computer system.

FIG. 1 is a block diagram of an exemplary hardware environment of the preferred embodiment of the present invention, and more particularly, illustrates a typical distributed computer system 10, wherein client computers 12 are connected via a network 14 to server computers 16. A typical combination of resources may include clients 12 that are personal computers or workstations, and servers 16 that are personal computers, workstations, minicomputers, and/or mainframes. These network 14 preferably comprises the Internet, although it could also comprise intra- nets, LANs, WANs, SNA networks, etc. Surfers of the Internet 14 typically use client computers 12 to surf on the World Wide Web.

Each of the computers, be they client 12 or server 16, generally include, inter alia, a processor, random access memory (RAM), data storage devices, data communications devices, monitor, user input devices, etc. Those skilled in the art will recognize that any combination of the above components, or any number of different components, peripherals, and other devices, may be used with the client 12 and server 16.

Each of the computers, be they client 12 or server 16, operate under the control of an operating system (OS), such as OS/390, AIX, UNIX, OS/2, Windows, etc. The operating system is booted into the memory of the computer for execution when the computer is powered-on or reset. In turn, the operating system then controls the execution of one or more computer programs by the computer. The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

In the present invention, the operating system (not shown) of the client 12 controls the execution of a web browser and the operating system 18 of the server 16 controls the execution of a web server 20. The web browser is typically a computer program such as IBM's Web Explorer, NetScape™, Internet Explorer, Mosaic, etc. The web server 20 is typically a computer program such as IBM's HTTP Daemon™ or other World Wide Web (WWW) daemon.

The present invention is usually (although not necessarily) implemented by a computer program 22 and its associated history log database 24 (also known as a web server log 24) that are executed, interpreted, and/or stored in at least one of the servers 16 under the control of that server's operating system 18. This computer program 22, which may be a separate computer program 22 or may be implemented within the operating system 18 or the web server 20, and its associated database 24, generates a model 26, which may or may not be stored in the program 22. The computer program 22, database 24, and model 26 cause the server 16 to perform the desired functions as described herein.

The operating system 18, web server 20, and computer program 22 are comprised of instructions which, when read and executed by the server 16, causes the server 16 to perform the steps necessary to implement and/or use the present invention. Generally, the operating system 18, web server 20, computer program 22, and/or database 24 are tangibly embodied in and/or readable from a device, carrier, or media, such as a memory, data storage device, and/or data communications device connected to the server 16. The tangible embodiments of memory are illustrative and not intended to limit the scope of the present invention. Under control of the operating system 18, the web server 18, computer program 22, and/or database 24 may be loaded from the memory, data storage device, and/or data communications device into the memory of the server 16 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

The Predictor Model

The SurfAid Predictor of the present invention works by creating a model 26 based on a site's web log 24 data and site content information. The site content information ascribes a group identifier to each downloadable item in the site, so that each item belongs to exactly one group. It further classifies these groups into three categories: features, actions, and behaviors.

Features are generally all the items downloaded from the server 16 during a session that are interesting choices made by the surfer from the client computers 12. These are the surfer actions that naturally help to distinguish one individual from another. Features can include, but are not limited to buying behavior.

Actions are those items that can be modified dynamically by the site server program 22 at runtime to affect the behavior of the surfer. For example, if the web server 16 shows an advertisement to a surfer, this would be an action. Actions are items that are performed by the site server 16 that affect behavior of the surfer.

Behaviors are those items that somehow contribute to the overall utility of a surfer's session from the perspective of the site owner. For example, if the surfer purchases an item, this is a behavior that positively contributes to utility. Behaviors are items that are performed by the surfer that affect the web site, e.g., purchasing an item.

A SurfAid Predictor Model 26 of the present invention is then a function of the following form:

$$F(f[\ ],a) \rightarrow b[\ ]$$

The feature vector f[ ] describes the surfer behavior up to the point at which an action a was downloaded. The behavior vector b[ ] describes what groups the model predicts the surfer will download subsequent to the action. For each action and each component of the behavior vector the SurfAid Predictor of the present invention produces a quantitative model. Running the present invention repeatedly on random samples from the web log results in a confidence interval for the predicted behaviors. The present invention also predicts surfer behavior and maximizes some utility function over that behavior.

Converting Web Logs into Features, Actions, and Behaviors

A web log 24 is a recording of the activities of surfers at a given site during a given time period. The activity of a single user over a contiguous time span is referred to as a session. Web log 24 data is first "sessionize" by identifying which transactions belong to which surfers. The web log 24 data is then "scrubbed" or "data cleansed," which comprises removing those sessions where the information recorded is incomplete or known to be erroneous. The activity information for the web log 24 data for each session is then sorted according to time stamp.

At this point the web site can be represented as a list of sessions: $S_1, S_2 \ldots S_n$. Each session can be further broken down into a sequence of items downloaded: $P_1, P_2, \ldots P_m$ where each item, P, is represented by a unique integer.

The web site items are then classified into groups: $G_1, G_2, \ldots G_v$. The present invention then replaces each session sequence of items with a corresponding sequence of item groups. This sequence of groups is then used to represent a Web Log Session. A set of Web Log Sessions is the first input to the SurfAid Predictor model 26 of the present invention.

In order to parse a given web log 24 session into features, actions and behaviors, it is necessary to define which item groups belong to each category. This Item Group Categorization is the second input to the SurfAid Predictor model 26 of the present invention. The Item Group Categorization defines three sets of Groups: F, A, and B for features, actions, and behaviors.

Within a single Web Log 24 Session, an action occurrence is defined to be any member of group sequence belonging to A. A Web Log 24 Session may contain from zero to m action occurrences. For each action occurrence in each session a feature vector is produced as follows.

A Vector V of zeros is created, with the length equal to the total number of feature groups. A set X is defined as the set of item group id's occurring before the action occurrence, and for all x∈X, V[x]=1.

The number of feature vectors for a given Web Log Sessions will be the same as the number of behavior vectors and this number will be equal to the total number of action occurrences in the Web Log 24 . The feature vectors and behavior vectors are saved in separate flat file tables along with a third flat file identifying which action group was associated with the action occurrence.

Generating Linear Models for Predicting Behavior Using SVD

After converting the Web Log into features, actions, and behaviors, the next step is to train a set of quantitative models that predict behavior given a feature vector. There are many possible ways to do this. The following algorithm finds a linear model that minimizes the squared error of the predictive model from the given training examples.

For each action a in A, feature vectors corresponding to an occurrence of a are identified. These feature vectors are placed in a new table called $FV_a$.

A matrix M from $FV_a$ is then created by letting each feature vector in $FV_a$ be a row of the matrix (so that each feature corresponds to a column). The matrix is then a description of the feature vectors. Although the preferred embodiment of the invention uses matrices, other descriptions can be used.

$M^{-1}$ is found using Singular Value Decomposition (i.e. $M^{-1}=V \cdot W^- \cdot U^T$).

For each action a in A, those behavior vectors corresponding to an occurrence of a are identified. These behavior vectors are placed in a new table called $BV_a$.

A matrix N from $BV_a$ is created by letting each behavior vector in $BV_a$ be a column of the matrix (so that each behavior corresponds to a row).

For each behavior b in B, the linear coefficients of the predictive model are determined by multiplying $M^{-1}$ by $BV_a[b]$.

Taken as a whole, the set of models generated from each action/behavior combination will predict a behavior vector for a given feature vector and action.

Example of the SurfAid Predictor Modeling Process

The following example shows how the SurfAid Predictor of the present invention is used to select and generate models using a Web Log and an Item Group Categorization.

TABLE 1

| Actions | Show Movie Ad | $A_1$ |
|---|---|---|
| | Show Theater Ad | $A_2$ |
| | Show Newspaper Ad | $A_3$ |
| Behaviors | TicketMaster | $B_1$ |
| | Subscription | $B_2$ |
| Features | Front | $F_1$ |
| | News | $F_2$ |
| | Sports | $F_3$ |
| | Library | $F_4$ |
| | Arts | $F_5$ |
| | Cyber | $F_6$ |

Table 1 illustrates the classification for the pages of a generic newspaper web site. In this example there are 6 feature groups, 3 actions groups and 2 behavior groups. A typical Web Log 24 Session is as follows:

Session={$F_1$, $F_1,\underline{A_1},F_2,F_3,B_1,\underline{A_2}$, $F_5,B_2,\underline{A_3},F_6$}

This session is then converted into three training examples (one for each action occurrence) as shown in Table 2:

TABLE 2

| F | A | B |
|---|---|---|
| 1 | 1 | 1, |
| 1,2,3 | 2 | 2 |
| 1,2,3,5 | 3 | 2 {} |

Each of these training examples is then converted into a unary representation as shown in Table 3:

TABLE 3

| F | A | B |
|---|---|---|
| [100000] | 1 | [11] |
| [111000] | 2 | [01] |
| [111010] | 3 | [00] |

This procedure is performed for all web log 24 sessions. The results are then grouped by action occurrence, and a linear model is generated for each Action-Behavior combination as shown below:

$$\begin{matrix} \text{Example 1:} \\ \text{Example 2:} \\ \text{Example 3:} \\ \\ \\ \\ \\ \text{Example 10:} \end{matrix} \begin{bmatrix} 101110 \\ 000010 \\ 000011 \\ 100000 \\ 110000 \\ 100100 \\ 010101 \\ 101010 \\ 000010 \\ 001000 \end{bmatrix} \times \begin{bmatrix} \beta_1 \\ \beta_2 \\ \beta_3 \\ \beta_4 \\ \beta_5 \\ \beta_6 \end{bmatrix} = \begin{bmatrix} 1 \\ 0 \\ 0 \\ 0 \\ 1 \\ 0 \\ 0 \\ 0 \\ 0 \\ 0 \end{bmatrix}$$

This equation can be solved using Singular Value Decomposition (SVD). The resulting predictive model 26 will be of the form:

$$P_{A,B}(F) = F_1 \cdot \beta_1 + F_2 \cdot \beta_2 + \ldots F_6 \cdot \beta_6$$

Generating Multiple Models from Random Samples

Figure 2:
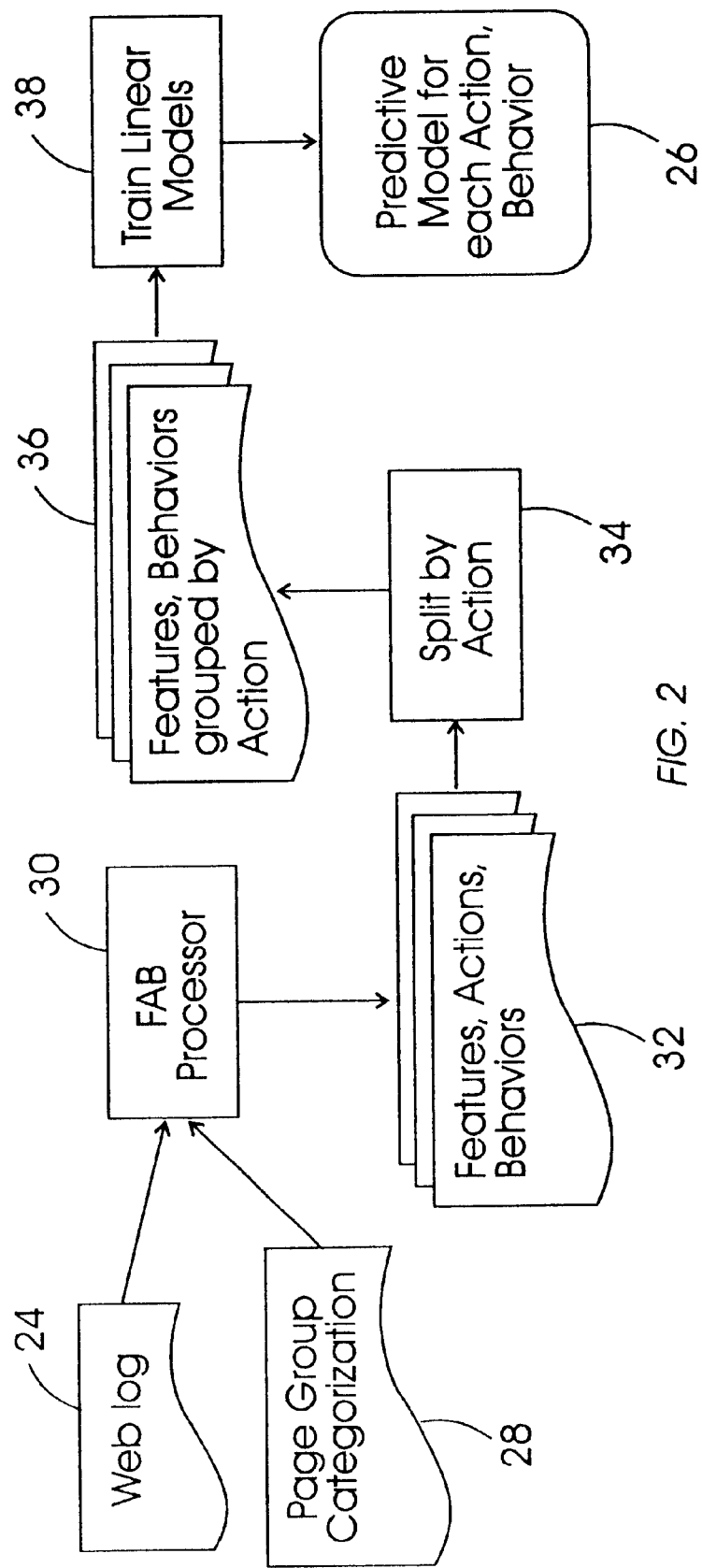
FIG. 2 is a flow diagram illustrating a method of the present invention for predicting behavior.

FIG. 2 is a flow diagram illustrating a method of the present invention for predicting behavior without an estimate of the confidence of the prediction.

The program 22 generates a single model 26 for a given action and behavior. The pages of the website are categorized into groups, and collected by the program 22. The page group (item group) categorization 28 and the web log 24 are inputs to the Features, Actions, and Behaviors (FAB) processor 30. The FAB processor 30 is typically part of the program 22, but can also be part of the operating system 18 or the HTTP Daemon 20. The FAB processor 30 generates the features, actions, and behaviors 32 that are associated with the website. Each of the features, actions, and behaviors 32 are divided up by actions associated with the website. The divided features and behaviors 34 are then grouped into groups 36, wherein each group is associated with a single action. Linear models 38 are then trained for the grouped features and behaviors 36, and then predictive model 26 is generated for each action and behavior, based on the grouped features and behaviors.

Figure 3:
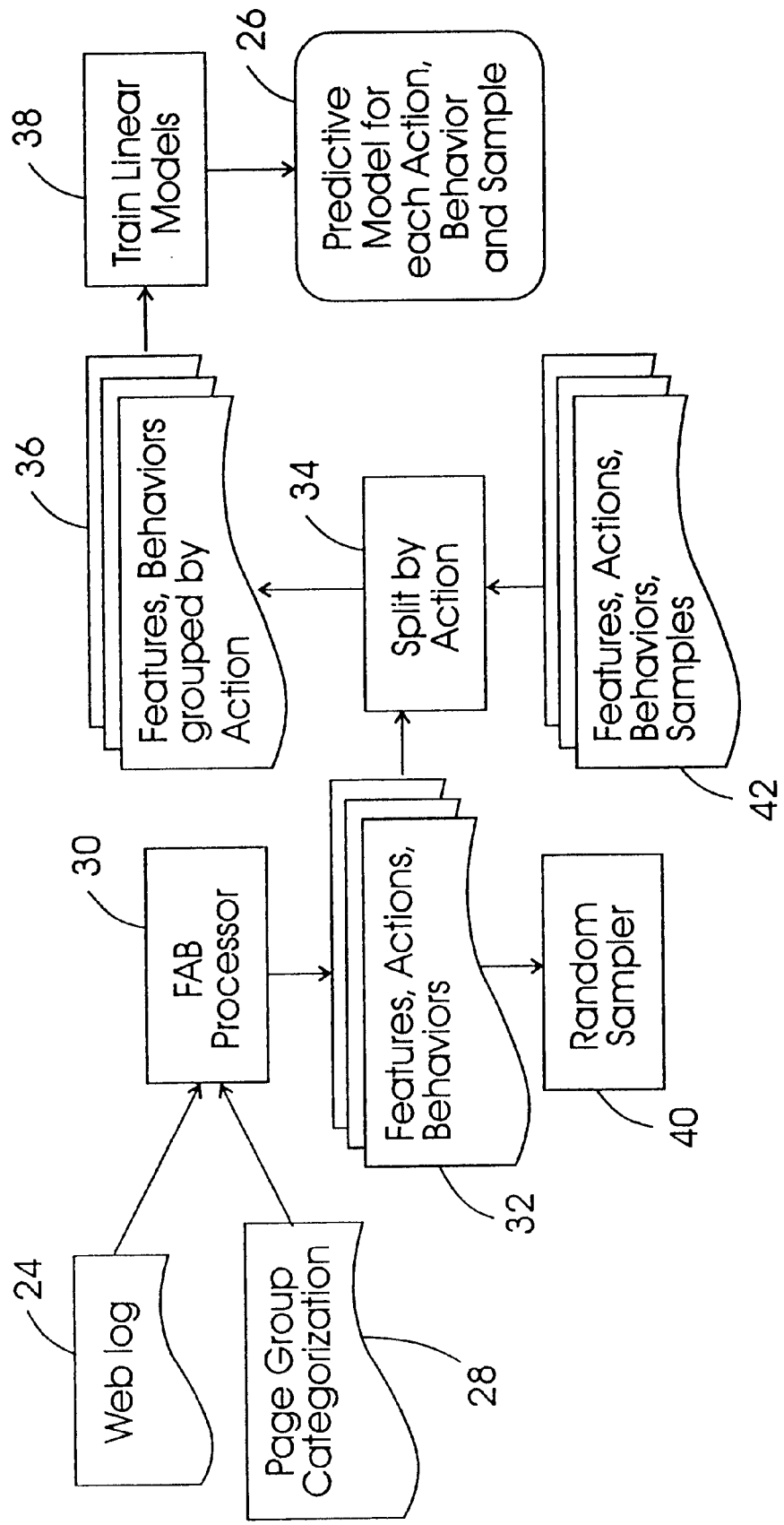
FIG. 3 is a flow diagram illustrating a method of the present invention for predicting behavior with an estimate of the confidence of the prediction.

FIG. 3 is a flow diagram illustrating a method of the present invention for predicting behavior with an estimate of the confidence of the prediction.

As in FIG. 2, the flow diagram of FIG. 3 shows that pages of the website are categorized into groups and collected by the program 22. The page group categorization 28 and the web log 24 are inputs to the Features, Actions, and Behaviors (FAB) processor 30. The FAB processor 30 is typically part of the program 22, but can also be part of the operating system 18 or the HTTP Daemon 20. The FAB processor 30 generates the features, actions, and behaviors 32 that are associated with the website.

Random sampler 40 is used to produce a smaller subset of the data for training in order to get an estimate of the confidence for the model 26. Once the random sampler 40 produces the sample features, actions, and behaviors 42, each of the sample features, actions, and behaviors 42 are divided up by actions associated with the website. The divided sampled features and behaviors 34 are then grouped into groups 36, wherein each group is associated with a single action. Linear models 38 are then trained for the grouped features and behaviors 36, and then predictive model 26 is generated for each action and behavior, based on the grouped features and behaviors.

With the method shown in FIG. 3, each action/behavior with sufficient information in the web log 24 data will have multiple models 26 generated. Each of these models 26 will predict an independent value for a behavior given a feature vector. The combination of all these predictions taken together for a single behavior represents a distribution. From this distribution a confidence interval can be inferred in any number of ways (e.g. 68.3% of the models 26 predict within this range).

The program 22 then generates a set of predictive models 26 for each random sample 42 generated by the random sampler 40. By taking a different random sample 42 a different set of predictive models 26 are generated. This generation process can be done as many times as desired, with all generated models 26 being saved.

Applying SurfAid Predictor Models to Predict Behavior and Utility

The SurfAid Predictor of the present invention, as applied to a Web Log as described in relation to FIGS. 2 and 3, and given an Item Group Categorization 28, generates models that are used to predict the effect (behavior) of downloading an advertisement (action) at any point in a surfer's session. In terms of an advertisement download action, the desired effect on that surfer's behavior is to have the surfer buy the advertised product, but the present invention is not limited to advertisements. As one example, surfers at a certain website might prefer a link to any number of other websites, and based on the features and behavior of a given surfer, the link displayed (action) can be chosen to maximize the tendency of that surfer to download the displayed link (behavior). The flow diagram of FIG. 3 illustrates a method that produces a mean behavior and a confidence interval for each potential action/behavior combination.

Figure 4:
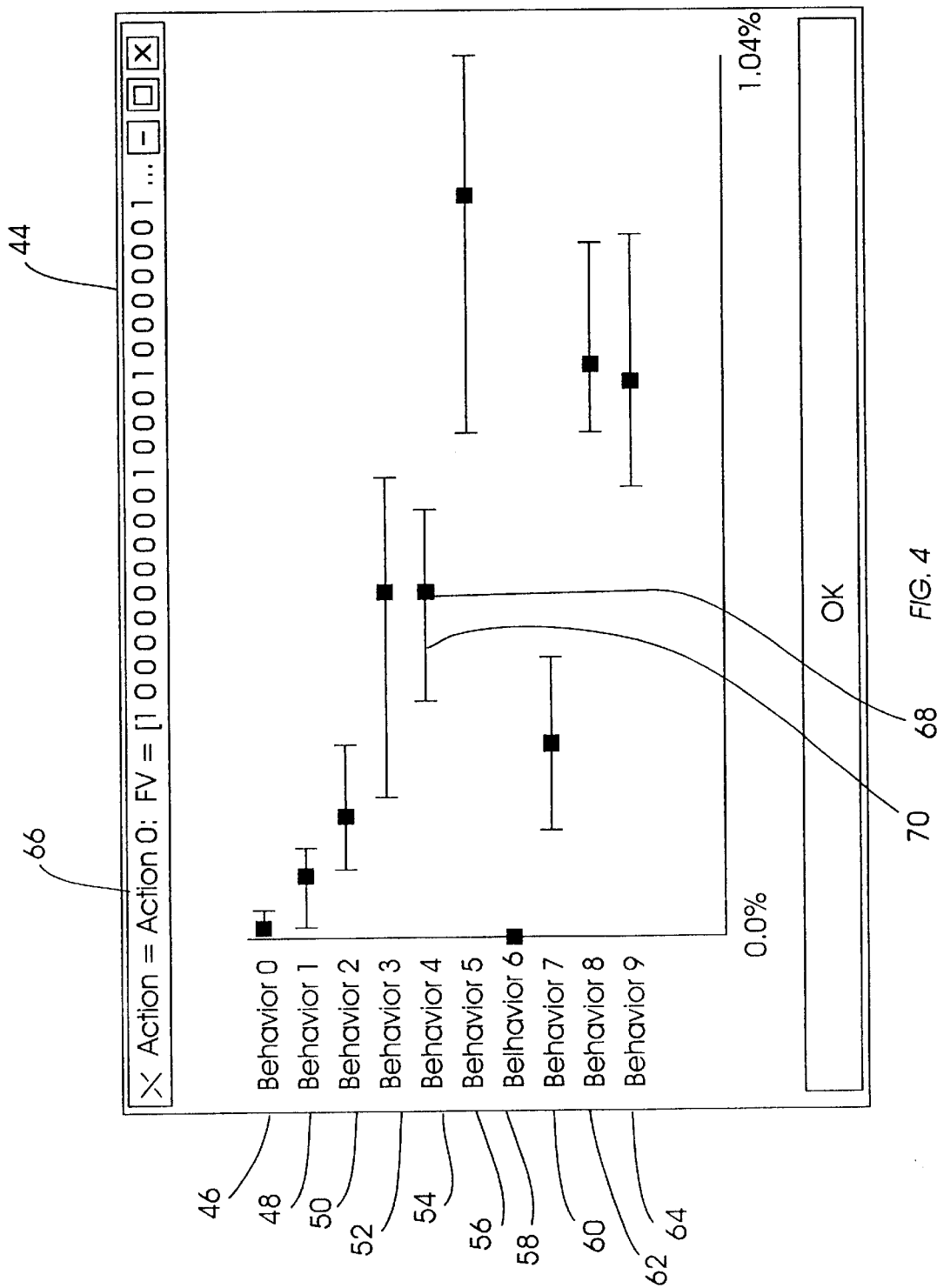
FIG. 4 illustrates a graphical output for the behaviors and confidence intervals for a single action.

FIG. 4 illustrates a graphical output for the behaviors and confidence intervals for a single action.

Window 44 shows behaviors 46–64 for action 0 66 shown in the header for window 44. Each behavior 46–64 has a mean and a confidence interval range related to action 0 66, where the mean is illustrated by a dot, and the confidence interval range is shown as a horizontal line with vertical bars at each end of the line. For example, for behavior 4 54, mean 68 is indicated by the dot adjacent to the behavior 4 54 entry, and the confidence interval range 70 is shown as a horizontal line with vertical bars at each end adjacent to the behavior 4 54 entry. Mean 68 is shown as a point on the confidence interval range 70. Each behavior 46–64 has a corresponding mean and confidence interval range. The confidence interval range allows a data analyst to judge the accuracy of each predictive model and thereby allows for better decision making based on the model's predictions.

A utility function is then defined for the set of behaviors 46–64, and a relative goodness value is assigned to each predicted behavior vector. Such a utility function allows the site server to automatically choose the best possible action to maximize site utility for each individual surfer. For example, a typical utility function is the product of the expected number of goods purchased of each type and the average profit margin of goods belonging to that type, summing the expected profit/good over each behavior in the behavior vector.

More generally, the predictive models are applied to theoretical feature vectors that can be constructed so as to represent entire populations of surfers. For example, if 20% of a surfer population visits page group A and 30% of the same population visits page group B, then this population of surfers is represented with a feature vector having the value for position A set to 0.2 and the value for position B set to 0.3. The behavior predictions generated by this theoretical feature vector represent the expected behavior (and from behavior, utility) of a representative member of this population after the specified action.

The applicability of the process described above is not limited to predicting the action of advertisements on surfers. In fact, by properly tailoring the definitions of the Feature, Action, and Behavior sets prior to training the predictive models, the process described in the present invention are used to predict what site, from a large number of possible sites, a given surfer is likely to want to visit next at specific time periods during their session at that site. By anticipating surfer behavior before it occurs, intelligent navigation aids may be implemented for a given site. Such navigation aids would make web browsing more intuitive and user friendly.

Figures 5, 6:
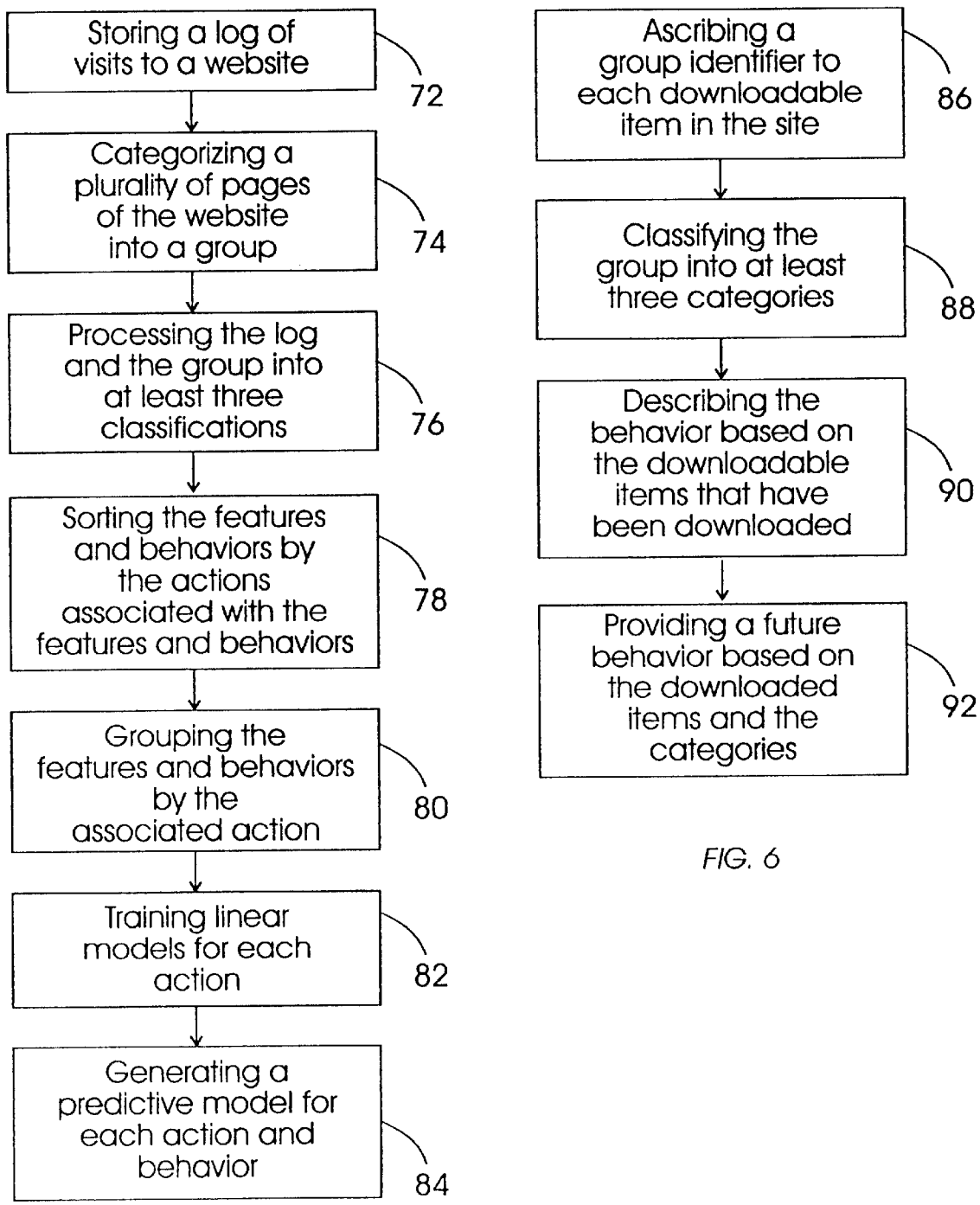
FIG. 5 is a flow chart illustrating the steps of one embodiment of the present invention.
FIG. 6 is a flow chart illustrating the steps of another embodiment of the method of the present invention.

FIG. 5 is a flow chart illustrating the steps of the present invention.

Block 72 represents the step of storing a log of visits to a website.

Block 74 represents the step of categorizing a plurality of pages of the website into a group.

Block 76 represents the step of processing the log and the group into at least three classifications, the classifications comprising features, actions, and behaviors.

Block 78 represents the step of sorting the features and dbehaviors by the actions associated with the features and behaviors.

Block 80 represents the step of grouping the features and behaviors by the associated action.

Block 82 represents the step of training linear models for each action.

Block 84 represents the step of generating a predictive model for each action and behavior.

FIG. 6 is a flow chart illustrating the steps of another embodiment of the method of the present invention.

Block 86 represents the step of ascribing a group identifier to each downloadable item in a site, wherein each downloadable item belongs to a group.

Block 88 represents the step of classifying the group into at least three categories.

Block 90 represents the step of describing the behavior based on the downloadable items that have been downloaded from the site.

Block 92 represents the step of predicting a behavior based on the downloaded downloadable items and the categories.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for dynamically generating views on web pages based on a log of user activities and site content information at a website, comprising:

recording a log of users' activities at a website, wherein the log is sessionalized for each user;

classifying a plurality of web site items from each session into item groups;

categorizing the item groups into at least three classifications, the classifications comprising features, actions, and behaviors;

grouping the features and behaviors by the actions associated with the features and behaviors;

producing a feature vector for each action occurrence in each session to describe a users behavior up to a point each action occurred;

producing a behavioral vector for each action occurrence in each session to describe which item groups a predictive model will predict the users will select subsequent to each action; and training the predictive model to predict the user's behavior and generate a behavior vector for a given a feature vector.

2. The method of claim 1, further comprising random sampling the features, actions, and behaviors.

3. The method of claim 2, wherein the grouping sorts the sampled features and behaviors by the associated action.

4. The method of claim 1, wherein the models are linear.

5. The method of claim 1, wherein the training the predictive model further comprises:

defining a set of actions that can be downloaded; and multiplying the feature vector and the set of actions to create a behavior vector.

6. An apparatus for predicting behavior at a website, comprising:

a network server with a memory; and a computer program, performed by the network server, for recording a log of users' activities at a website, wherein the log is sessionalized for each user; classifying a plurality of web site items from each session into item groups; categorizing the item groups into at least three classifications, the classifications comprising features, actions, and behaviors; grouping the features and behaviors by the actions associated with the features and behaviors; producing a feature vector for each action occurrence in each session to describe a user's behavior up to a point each action occurred; producing a behavioral vector for each action occurrence in each session to describe which item groups a predictive model will predict the users will select subsequent to each action; and training the predictive model to predict the user's behavior and generate a behavior vector for a given a feature vector.

7. An article of manufacture comprising a computer program carrier readable by a computer and embodying one or more instructions executable by the computer to perform method steps for configuring an operating system, the method comprising:

recording a log of users' activities at a website, wherein the log is sessionalized for each user;

classifying a plurality of web site items from each session into item groups;

categorizing the item groups into at least three classifications, the classifications comprising features, actions, and behaviors;

grouping the features and behaviors by the actions associated with the features and behaviors;

producing a feature vector for each action occurrence in each session to describe a users behavior up to a point each action occurred;

producing a behavioral vector for each action occurrence in each session to describe which item groups a predictive model will predict the users will select subsequent to each action; and training the predictive model to predict the user's behavior and generate a behavior vector for a given a feature vector.

* * * * *